Figure 1:
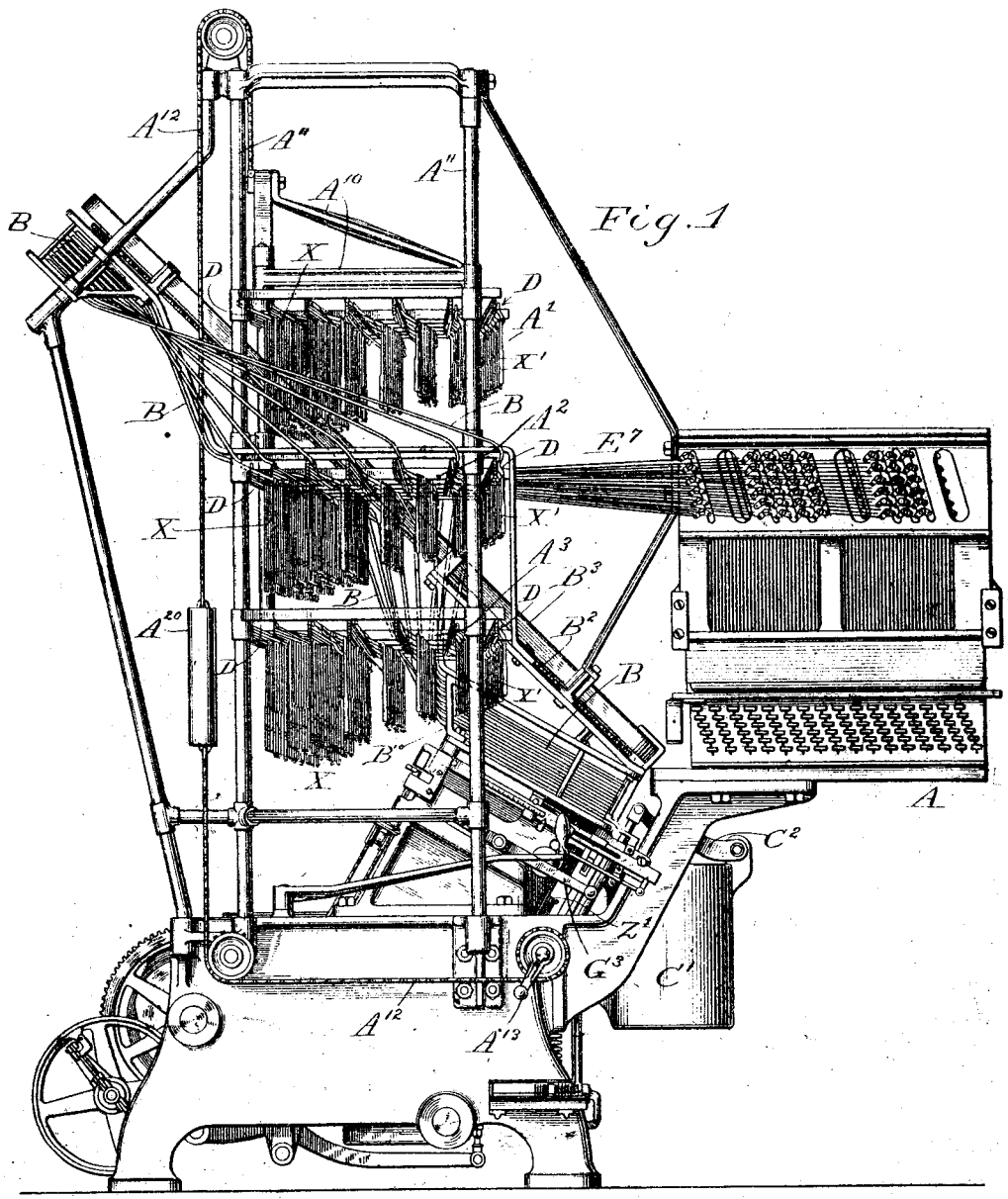

J. R. ROGERS.
TYPOGRAPHICAL MACHINE.
APPLICATION FILED AUG. 22, 1913.

1,137,022.

Patented Apr. 27, 1915.
14 SHEETS—SHEET 6.

Witnesses:

Inventor
John R. Rogers
By his Attorneys

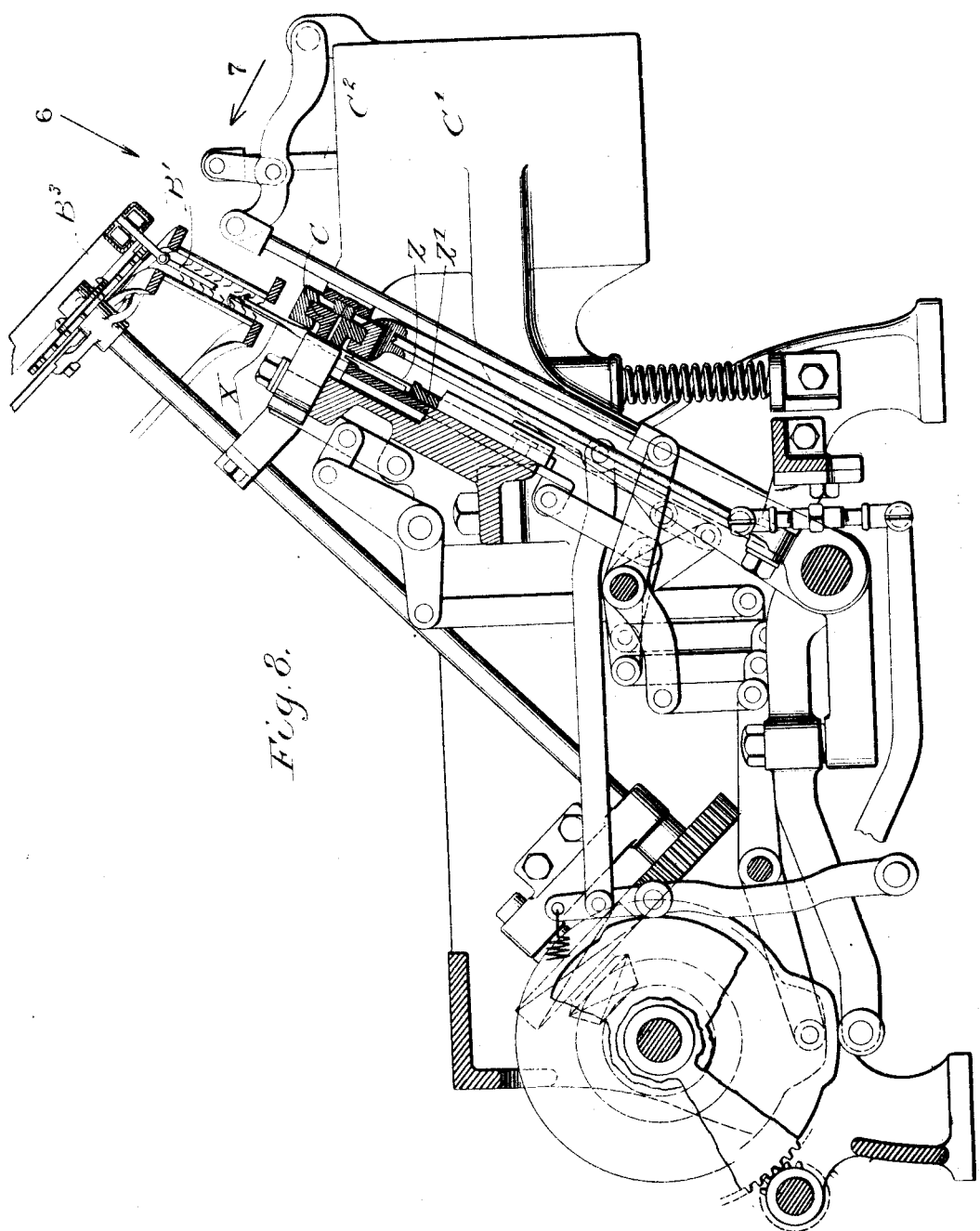

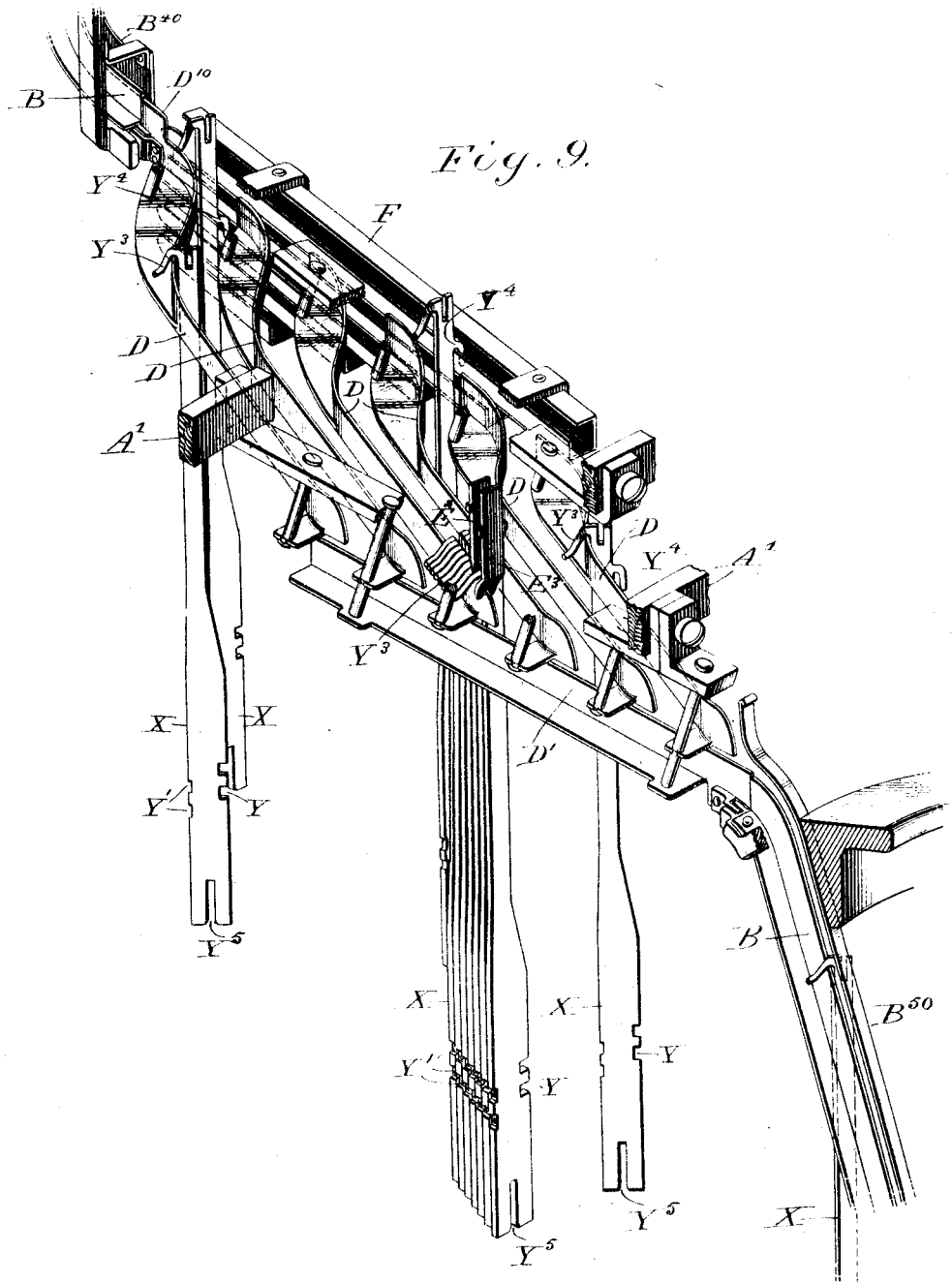

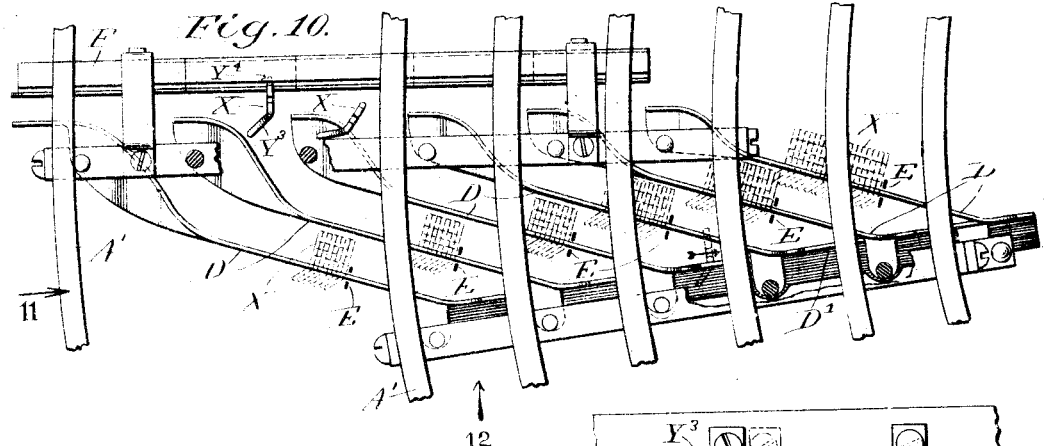
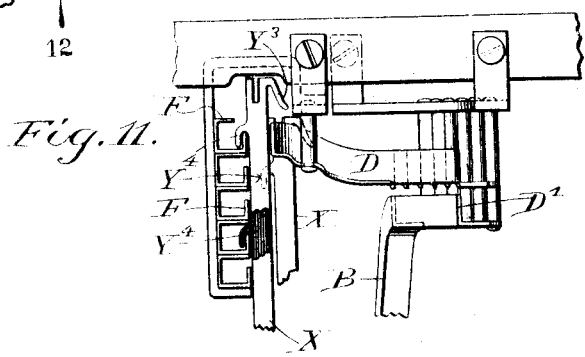
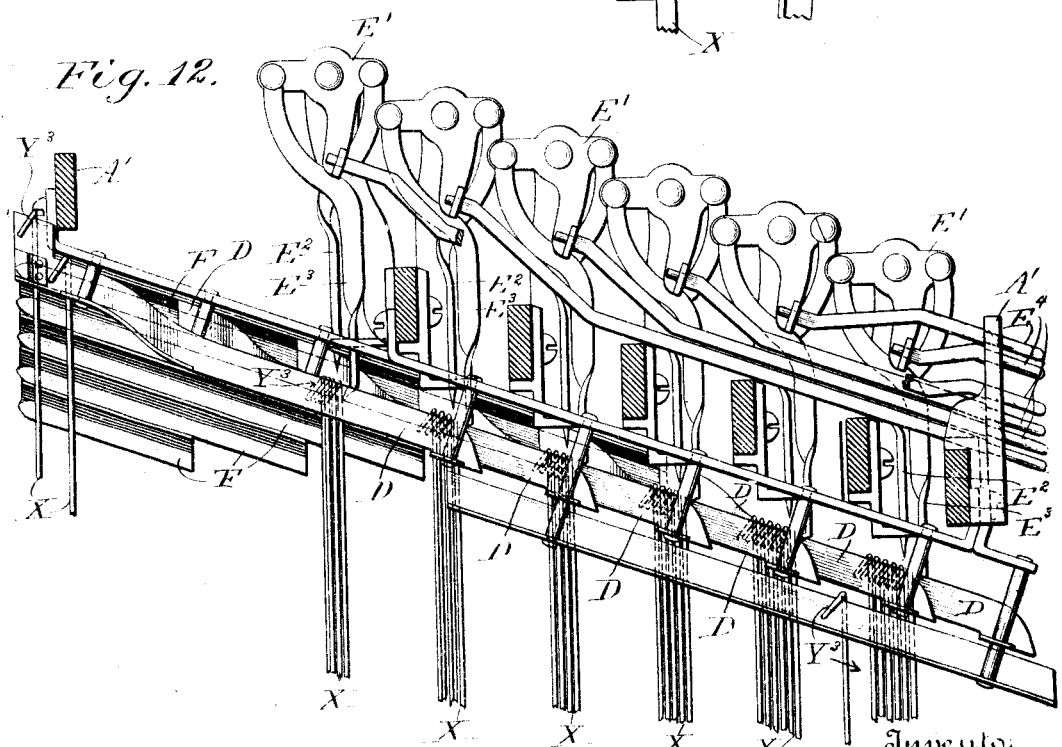

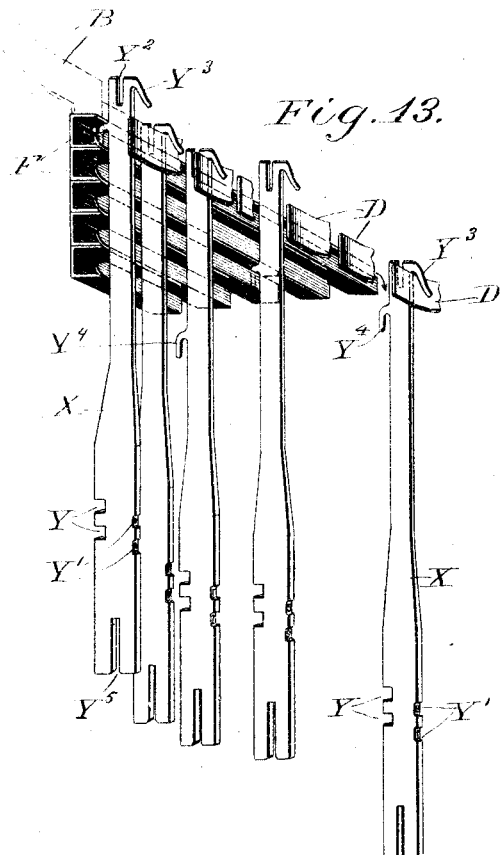
Fig. 13.
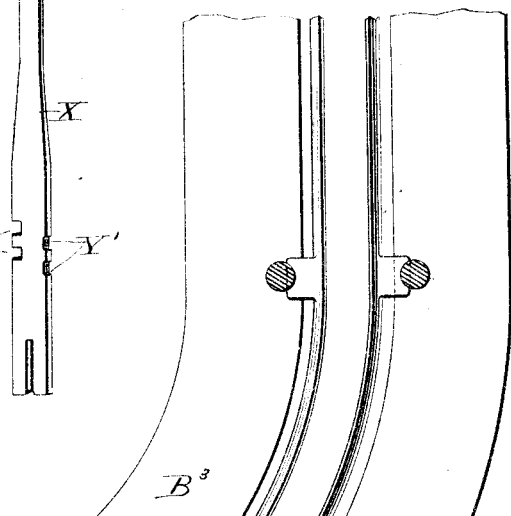
Fig. 14.
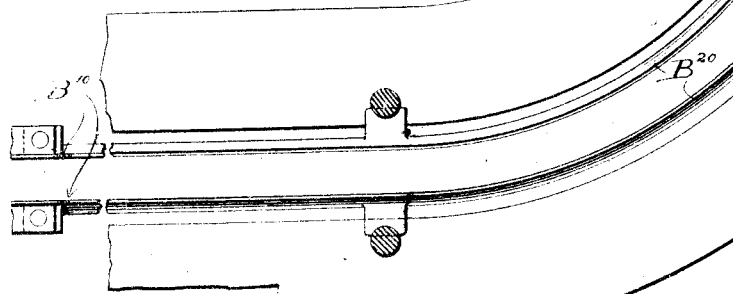

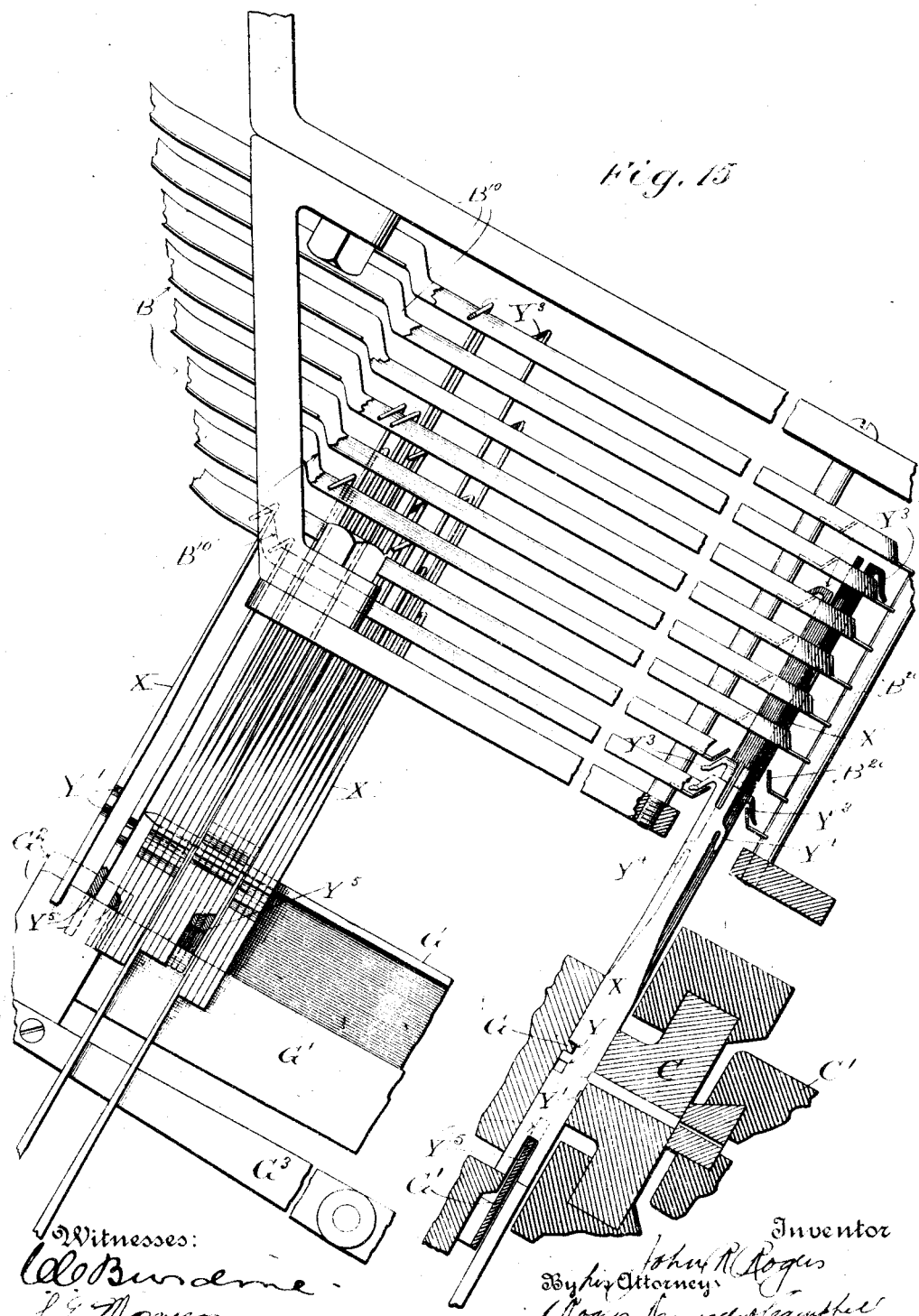

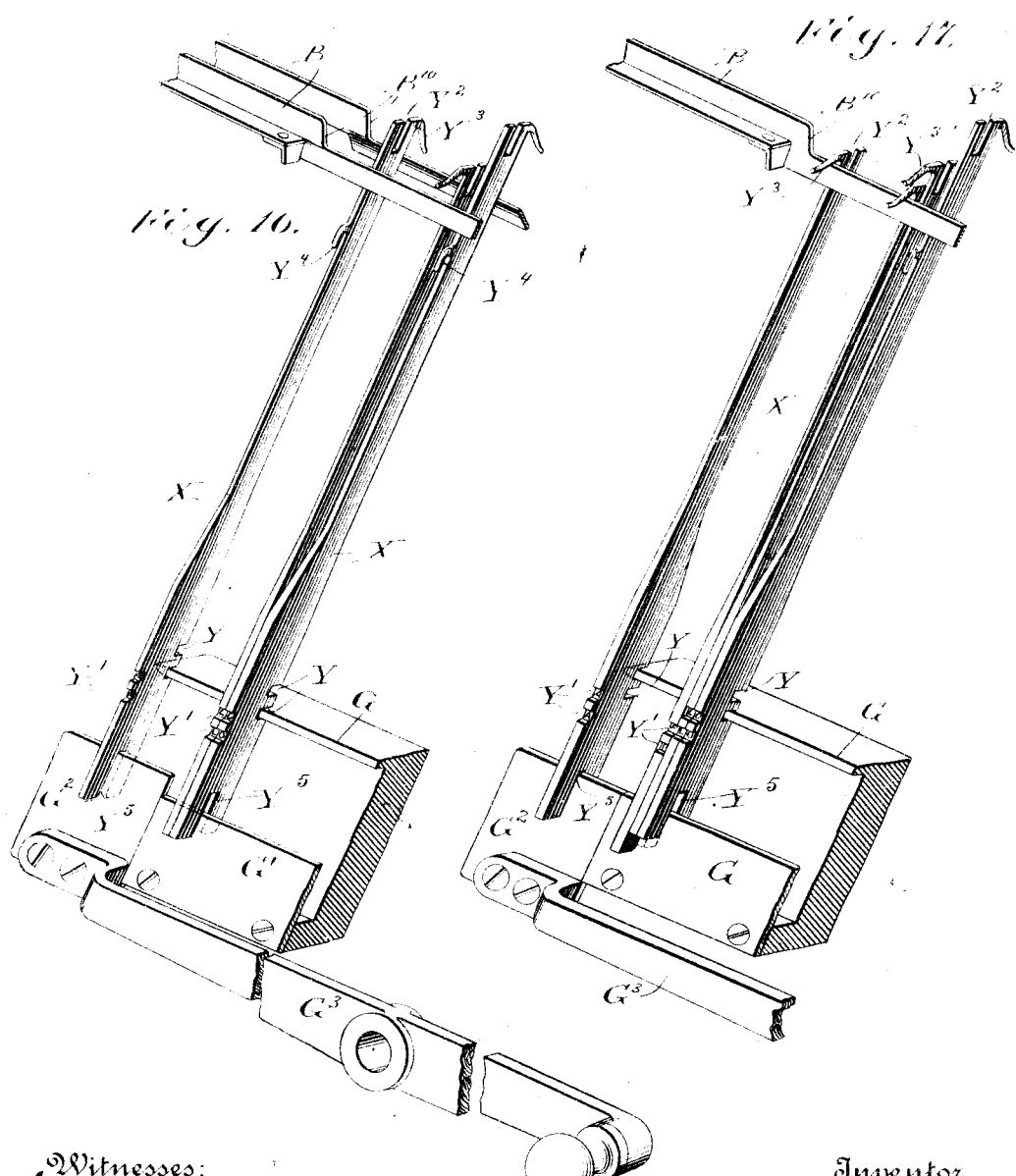

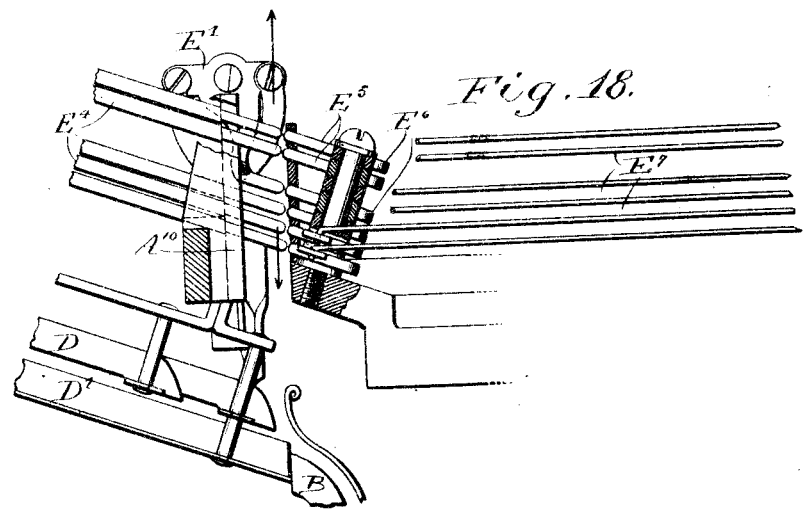
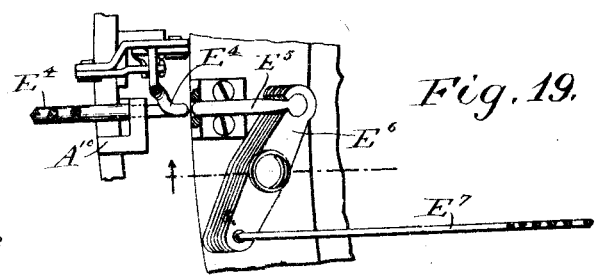
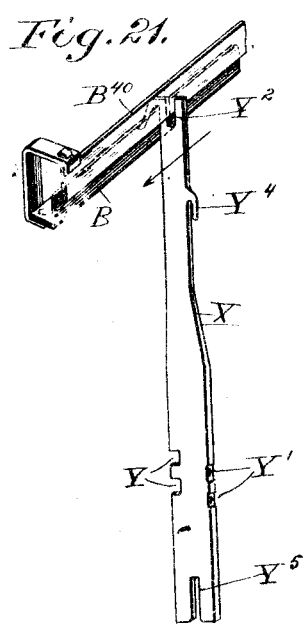
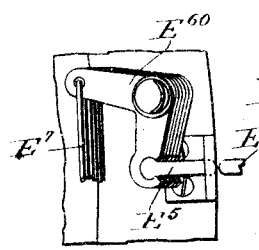

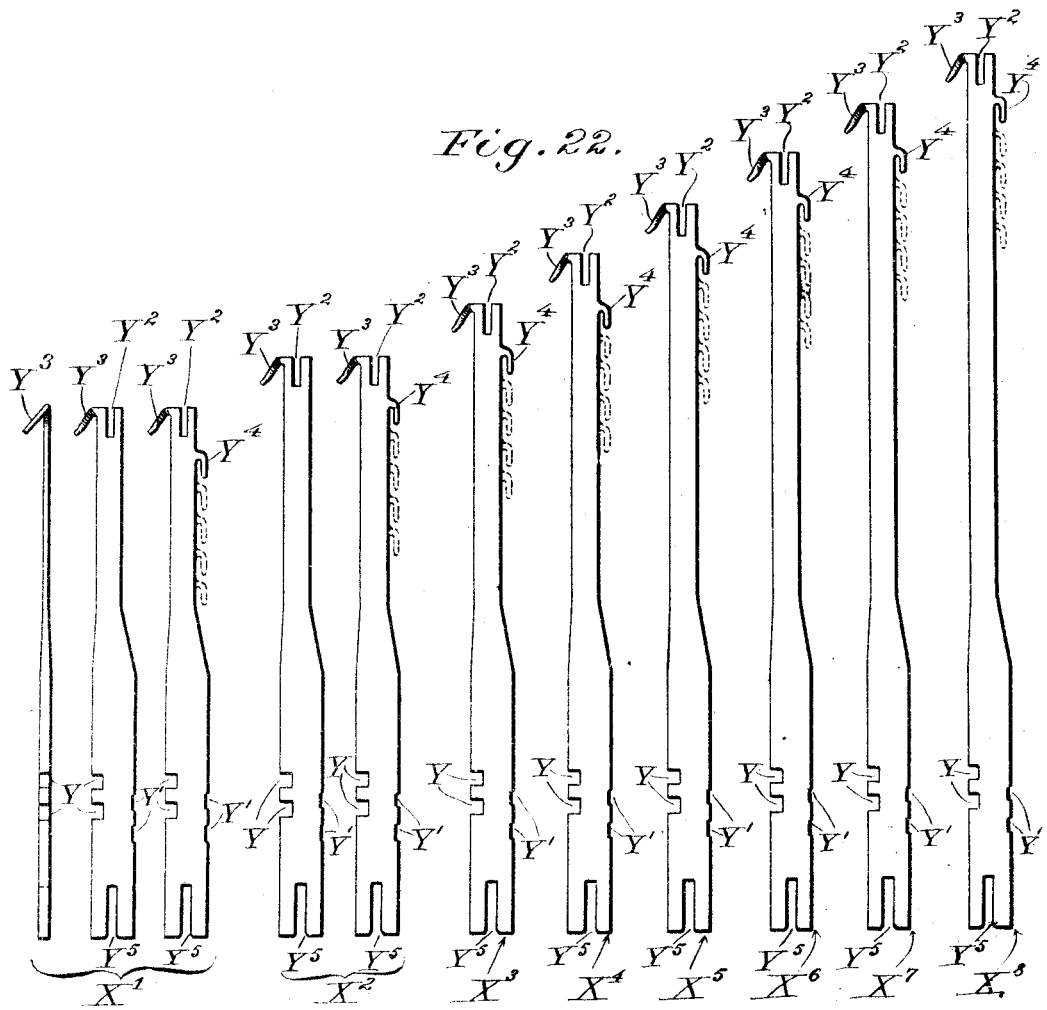

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

TYPOGRAPHICAL MACHINE.

1,137,022. Specification of Letters Patent. Patented Apr. 27, 1915.

Application filed August 22, 1913. Serial No. 788,083.

*To all whom it may concern:*

Be it known that I, JOHN R. ROGERS, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines, wherein a series of letter matrices assembled temporarily in line are presented to close one side of a slotted mold, into which molten metal or equivalent material is delivered, so as to produce a slug or linotype on which the type characters are formed by the matrices.

More particularly, it relates to linotype machines of the kind known to the trade as "Junior," as illustrated for instance in numerous Letters-Patent of the United States granted to me, such as No. 679,481, July 30, 1901. As in the said patent, the matrices herein are suspended from endless guides, which are arranged at one point of their length in converging lines for the purpose of assembling the selected matrices, and at another point in their length in diverging lines for the purpose of restoring them to their place of storage.

My present invention contemplates the adaptation to machines of this kind of means whereby a font of suspended matrices may be removed from operative position, and another one substituted therefor, at will. This end I preferably accomplish by the employment of a plurality of suspending devices or magazines for the different fonts, the said devices or magazines being connected, and means being provided to effect their shifting, so as to bring any selected font into operative position and registration with the continuous guides, whereon the matrices are assembled and moved to casting position, and along which they are thereafter restored to the magazine from which they started. One effect of this construction is to preserve the use of the so-called "circulating" system, whereby the matrices are restored to their magazine or place of storage through a path different from that pursued by them during assemblage. In one sense, the above arrangement interrupts the continuity of the guides, in that they are no longer endless and integral, as a sufficient space must be left between their ends to permit the shifting and interchange of the several magazines. However, in the broader sense, the continuity of the guides is not thereby interrupted, as when the parts are in operative relation to each other, the gap is always filled by the magazine in use, and in such manner that when the matrices are released therefrom they pass onto the guides, and then along them until they are restored to the magazine. In connection with this specified arrangement, other valuable features and improvements are also presented. For instance, the number of guides is materially reduced, this being effected by the division of the matrices in each magazine into a plurality of groups, each group containing a plurality of different kinds of matrices or sub-groups, and all the matrices of such a group being adapted to travel on a single guide. In connection with this feature, I also provide means whereby, when the matrices of a group are returned to the magazine on a single guide, they are separated or distributed into sub-groups for storage.

While I have embodied the two before-described features conjointly in the same construction, it will be apparent that they are nevertheless distinct improvements and may be employed singly if desired. Thus, the interchangeable font principle may be applied to machines, wherein there is a guide or wire for each different kind of matrix, as disclosed in my earlier patents; or, the reduced number of guides may be employed in connection with a single font of matrices, or a stationary magazine, by providing means for storing the matrices in sub-groups, and means for delivering the matrices of different sub-groups to the same guide, and further means to restore the different sub-groups from the single guide to their respective places of storage.

In order to further increase the capacity of the machine, I preferably construct the matrices, each with a plurality of characters, and provide means whereby one or another thereof may be brought into operative position for casting, at will. These, and numerous other features of construction will be described in the specification, and subsequently pointed out in the claims.

In the accompanying drawings, I have shown my invention in preferred form and by way of example, and as applied to the particular style of machine already mentioned. However, many variations and alterations may be made therein, and in its mode of adaptation, which will still be comprised within its spirit. Thus, it may be applied to type casting machines, etc., or to any form of typographical machine, whether designed to produce type, dies, or matrices, or the slugs or linotypes herein alluded to.

Generally speaking, I desire it to be understood that I do not limit myself to any specific form or embodiment, except in so far as such limitations are specified in the claims.

Figure 2:
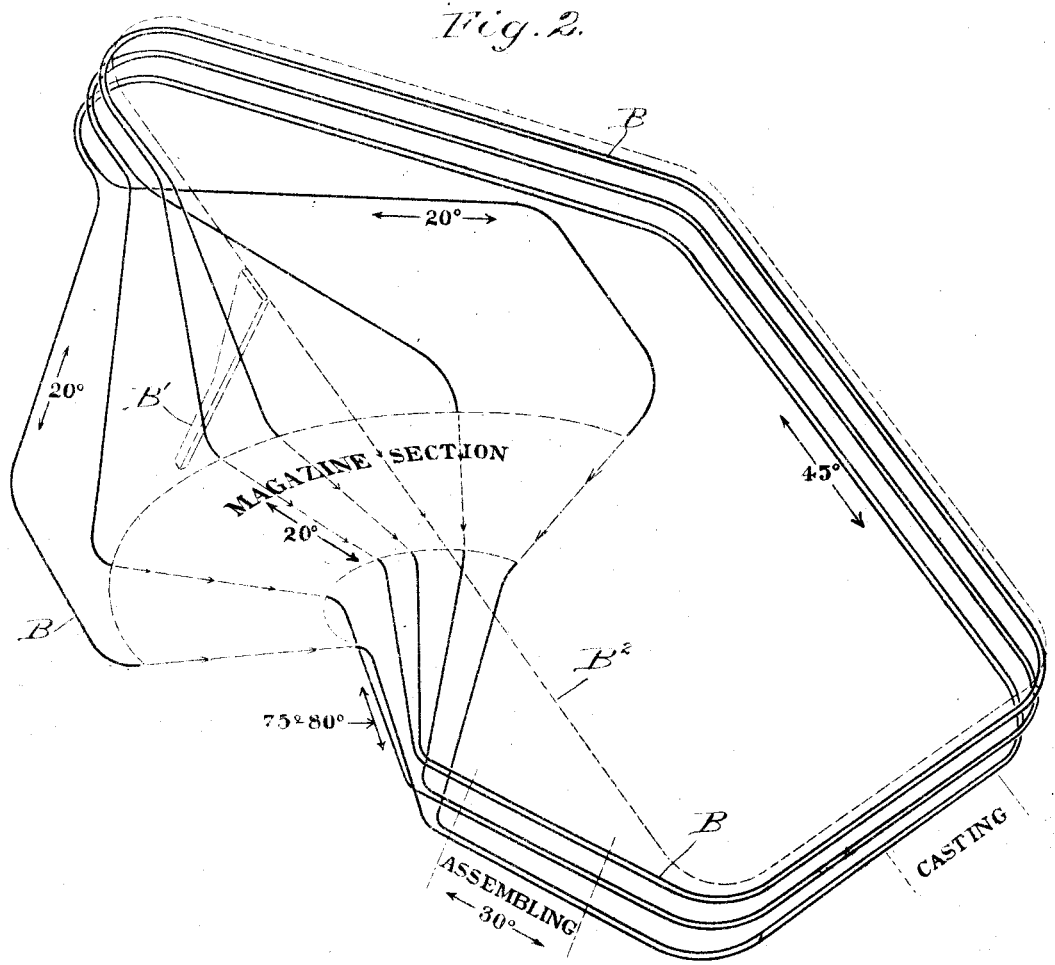
Figure 3:
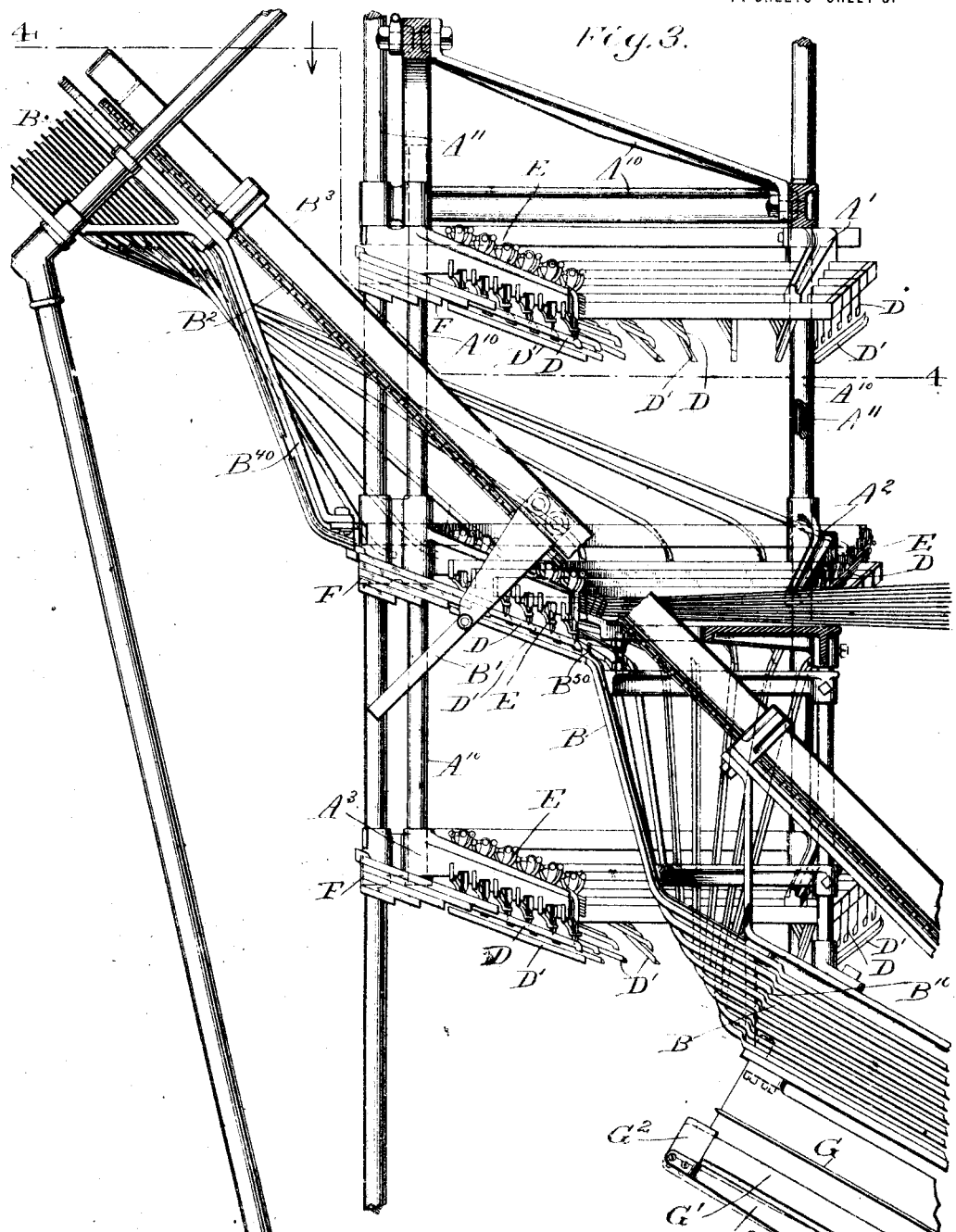
Figure 4:
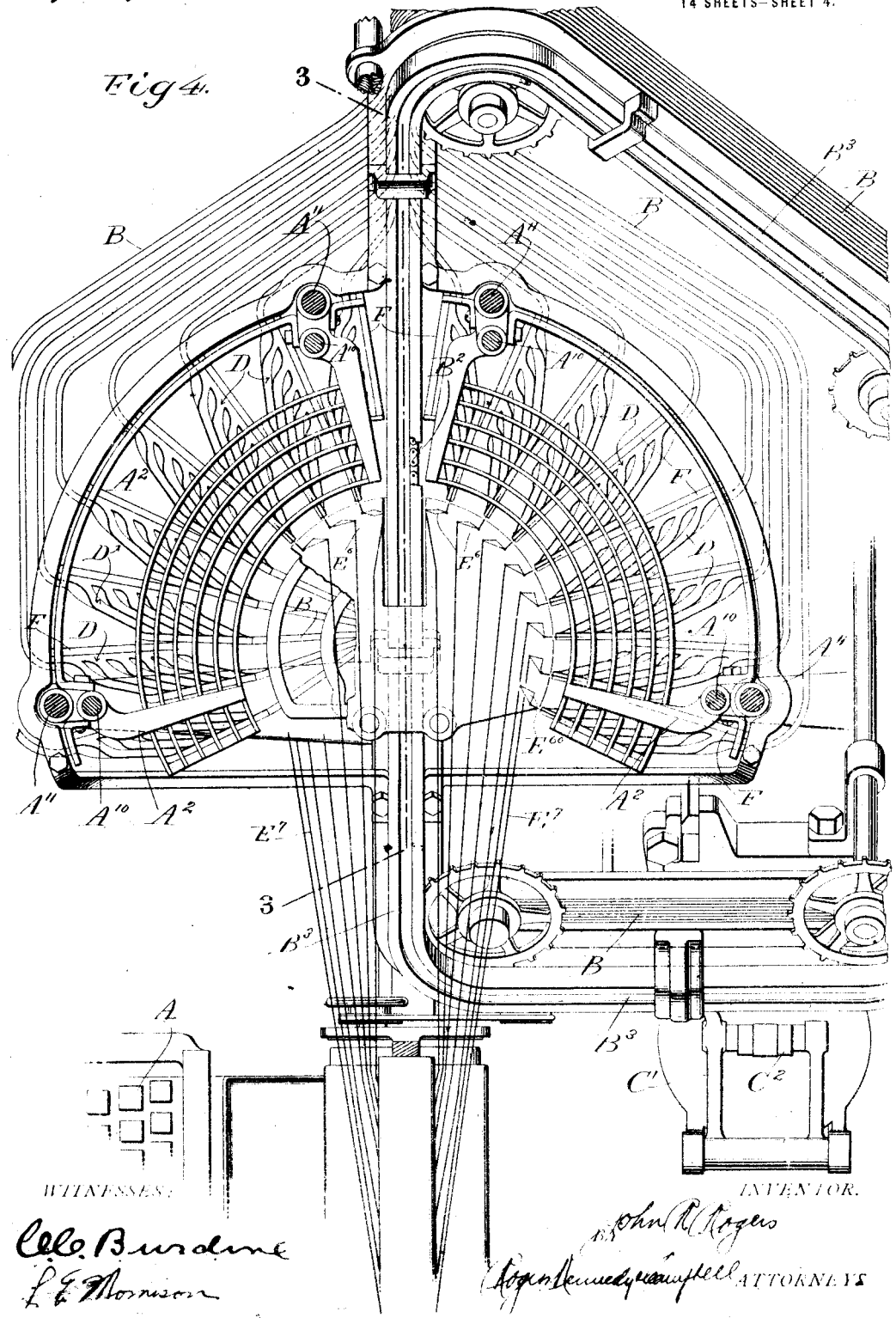
Figure 5:
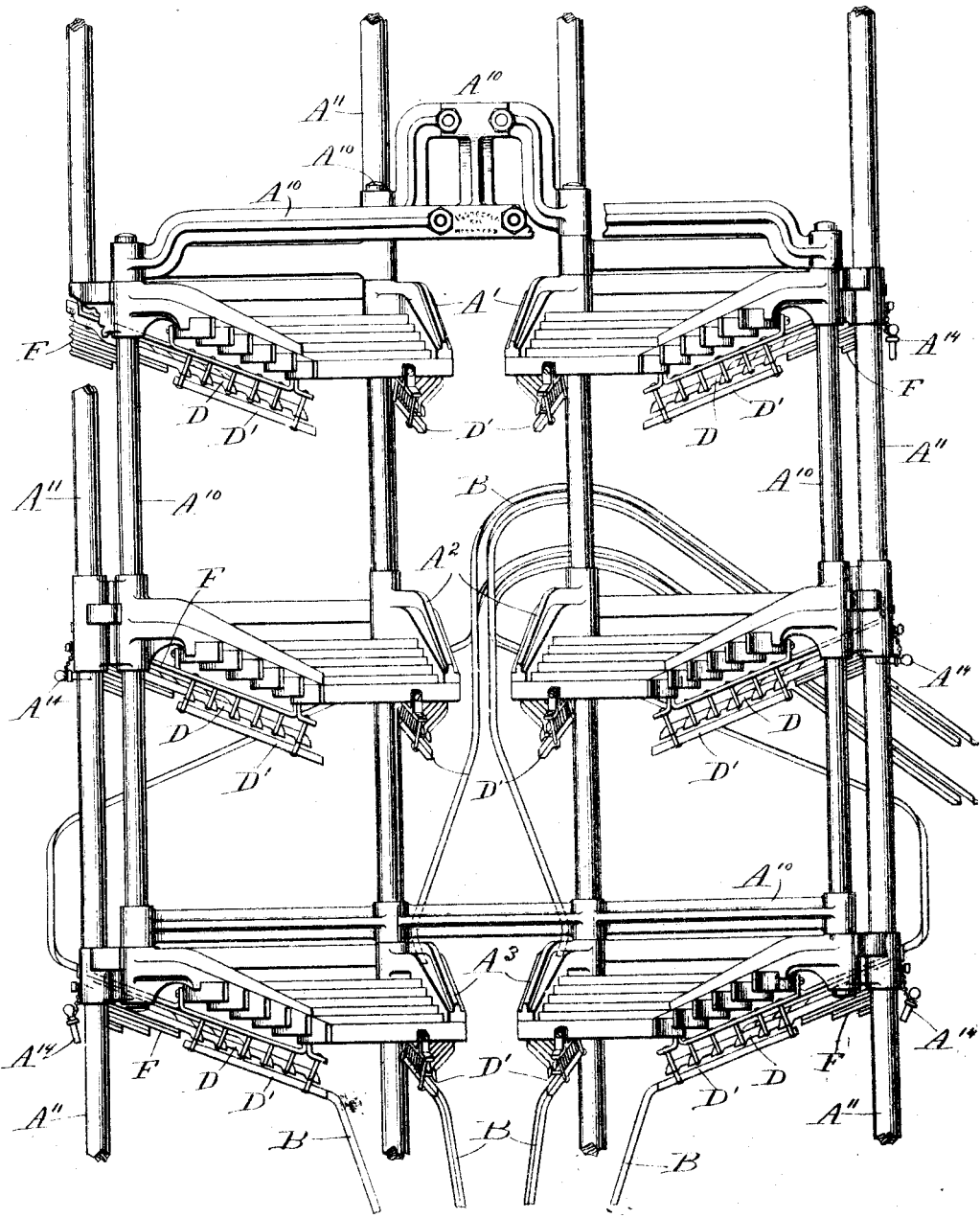
Figure 6:
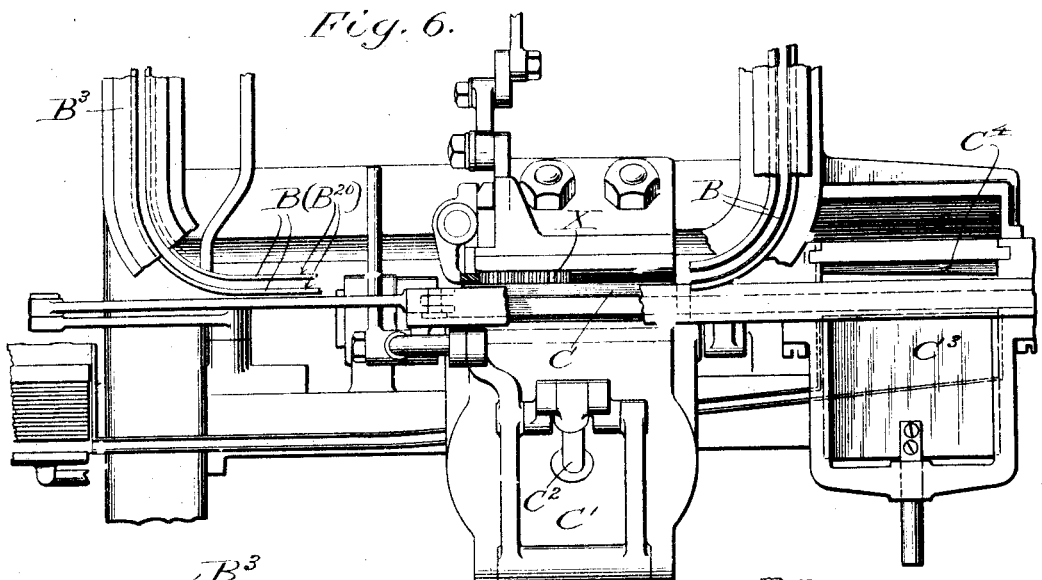
Figure 7:
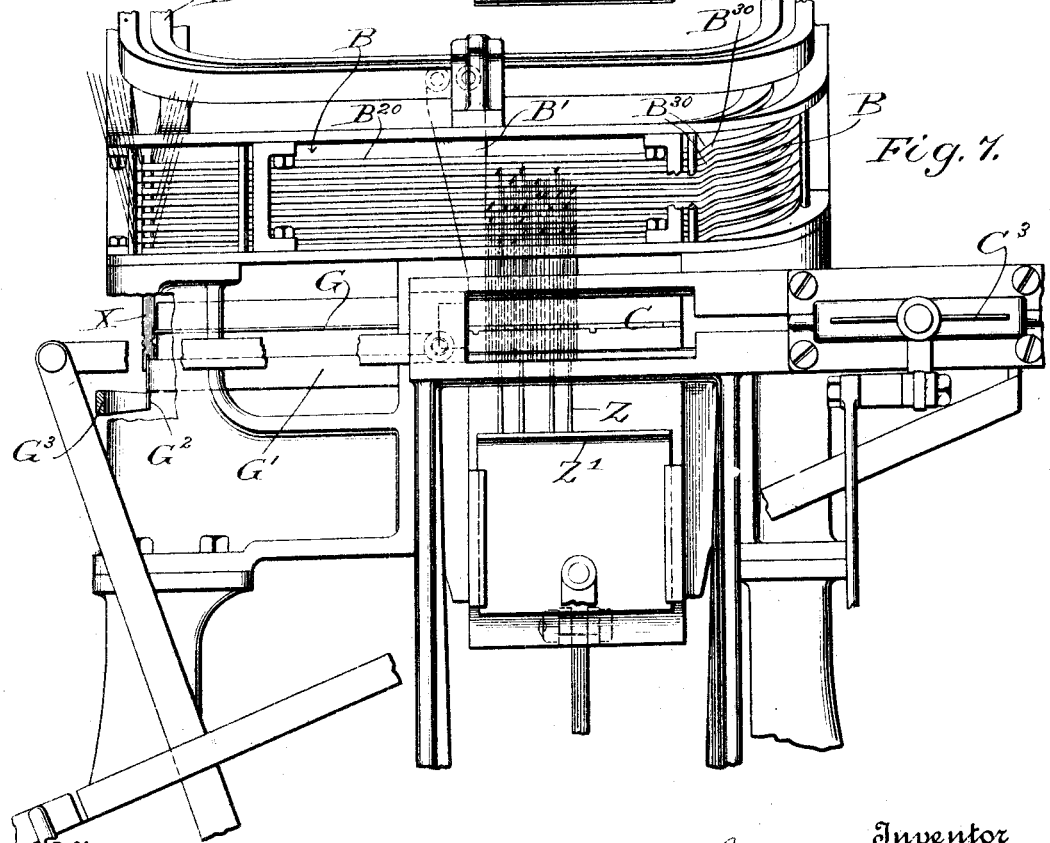

Referring to the drawings: Figure 1 is a general view of the machine; Fig. 2 is a diagrammatic view of several of the guides, illustrating their general arrangement, the assembling and casting positions, and their relation to the magazine section; Fig. 3 is a vertical section on the line 3—3 of Fig. 4, certain of the parts being omitted for the sake of clearness; Fig. 4 is a sectional plan view on the line 4—4 of Fig. 3; Fig. 5 is a partial front view of the connected magazines, etc.; Fig. 6 is a plan view of the forward portion of the guide-way, casting mechanism, etc., looking substantially in the direction of the arrow 6 in Fig. 8; Fig. 7 is a similar front view, looking substantially in the direction of the arrow 7 in Fig. 8; Fig. 8 is a transverse vertical section through the casting mechanism, justifying devices, etc.; Fig. 9 is a perspective view of a magazine group, its distributing devices, etc.; Fig. 10 is a plan view thereof; Fig. 11 is an end view thereof, looking substantially in the direction of the arrow 11 in Fig. 10; Fig. 12 is a side view thereof, looking substantially in the direction of the arrow 12 in Fig. 10; Fig. 13 is a detached perspective of the distributing bars, etc.; Fig. 14 is a plan of a pair of guides at the assembling point, etc.; Fig. 15 is an elevation of the assembling and casting portions of the guides, etc., partly in section and broken away; Fig. 16 is a detached perspective view, illustrating the means for shifting the matrices longitudinally to bring one or another of their characters into casting position; Fig. 17 is a similar view, showing the parts in different positions; Fig. 18 is a sectional side view of the escapements and their actuating connections, etc.; Fig. 19 is a plan view thereof; Fig. 20 is a similar plan view, showing some of the parts in different form; Fig. 21 is a detail, illustrating special means for holding the matrices on the guides; and Fig. 22 is a view of the various forms of matrices employed.

As is usual in machines of this kind, the suspended matrices X are released one by one through the manipulation of the keyboard A, and are delivered to their appropriate guides B, whereon they are assembled in connection with expansible spacers Z, all in the well-known manner. The composed line is then shifted by the slide $B^1$, which is moved by the chain $B^2$ along the endless guideway $B^3$. The line is first transferred into operative relation to the mold C (see Figs. 6, 7 and 8), where it is justified by the slide $Z^1$ acting upon the spacers Z. Molten metal is then injected into the mold from the pot $C^1$ by a pump $C^2$, after which the mold C clears the matrices and moves laterally, and the blade $C^3$ ejects the slug and causes it to pass between the trimming knives $C^4$, when it is delivered into the customary galley. After the casting operation, the matrices X are moved by the slide $B^1$ along the guides B until they are returned to the magazine from which they started.

The particular forms of the casting, alining, justifying, ejecting, and trimming mechanisms, etc., constitute no part of my present invention and need no further description herein. They may be of any preferred or approved kind, such for instance, as illustrated in my previously mentioned patents, although in the present instance I have shown mechanisms substantially similar to those disclosed in my Patent No. 734,096, except that the said parts are tilted forwardly at an angle of about 60°, and are not located at the same point as in the commercial "Junior."

As previously stated, and as indicated in Fig. 2, the guides B extend from the magazine to and through the assembling and casting positions, and then upward to the opposite side of the magazine. As the latter is movable, this involves an interruption in the continuity of the guides, but the gap between their ends is always filled by a magazine when in operative position. In the present instance, I show three magazines $A^1$, $A^2$, and $A^3$, any selected one of which may be brought into proper relation to the guides. To this end, the magazines are superposed and connected by suitable framing $A^{10}$, the latter being preferably arranged to be guided by and slide upon the vertical frame-uprights $A^{11}$. Any suitable means may be employed for shifting the magazines, such as those illustrated in Fig. 1, comprising the chain and pulley system $A^{12}$, connected to the operating handle $A^{13}$, and if desired the counterpoise $A^{20}$. Similarly, any suitable means may be employed for securing the selected magazine in position, for instance the magazine $A^2$ (Figs. 1, 3, and 4), or $A^3$ (Fig. 5), such as the pins $A^{14}$ (Fig. 5) adapted to engage suitably located holes in the uprights $A^{11}$. By the proper manipulation of these means, any font of matrices may be brought into operative relation to the guides B and registered therein, in the manner well understood in the art. The magazines are substantially semi-circular in form, and it will be noted (Figs. 4 and 5) that they are divided transversely, so as to leave a suitable space or gap between the sections to permit their vertical movement relatively to the transverse guideway B³ and other parts.

As distinguished from the ordinary sustaining wires of the earlier construction, and to secure rigidity and convenience of application, I prefer that the guides B shall be flanged or L-shaped in cross-section, as clearly disclosed in the drawings, wherein the matrices are shown as suspended from the vertical flanges of the guides. The guides are generally disposed in the well-known manner, namely, with converging and descending portions to the assembling position, and subsequently with ascending and diverging portions from the casting position to the distributing point. Preferably also, and to a point beyond the casting position, the guides are arranged in two vertical tiers, corresponding respectively to the two separated sections of the magazine. The close relation of the guides, one above the other in the respective tiers, serves to hold the matrices in proper relation to their respective guides, the guides above acting to hold the matrices in proper position upon the ones below. When the guides diverge, and when their vertical relation is consequently disturbed, or in connection with the uppermost guide in a vertical tier, supplemental holding means may be employed, such as the vertical plate B⁵⁰, which engages in the upper notch Y² of the matrices, as shown in Fig. 2¹. The application and function of these holding plates will be readily understood, although to avoid complication, they are not illustrated in other figures of the drawings.

Referring particularly to Figs. 2 and 3, it will be seen that the inclination of the guides B has been somewhat altered to adapt them to the present arrangement of magazine. While their general or average inclination is substantially the same as in the standard "Junior," the converging or descending parts now consist of a series of inclined portions, in order that the magazine inclination may be about 20°, and therefore some of the guides are so formed that when the matrices are released therefrom, they descend almost vertically, or substantially at an angle of 80°, to the assembling portion, which in turn is inclined at an angle of about 30°. This alteration in inclination arises from the slope of the magazine hangers, which should be about 20°, and from the consequent limitation of space which necessitates an almost vertical drop to the assembling portion. In order to hold the matrices in proper relation to these abruptly inclined portions of the guides, I preferably employ overlying plates B⁵⁰, as shown in Figs. 3 and 9. After the guides converge and descend to and through the assembling position, they extend laterally and substantially horizontally for some little distance, before they diverge and ascend, as shown in Figs. 4, 6 and 7, and it is at the said lateral portions of the guides that I preferably locate the casting mechanism, etc., as previously described.

Each of the magazines has a plurality of suitably mounted groups of hangers D, corresponding in number to that of the guides B. For instance, the drawings show sixteen guides, divided into two vertical series of eight each, and the magazines as divided into sixteen groups, eight on each side of its median division, and each group adapted to coöperate with one of the guides B. Each of the sixteen magazine groups contain six hangers D, each adapted to support a series of matrices having the same characters, and all of which are discharged onto the corresponding guide B. In other words, the sixteen magazine groups, each having six hangers, are adapted to support ninety-six matrices, which are delivered to and controlled by sixteen guides.

It will be noted that the several groups of hangers are arranged at the same level and radially about a common central point, giving the before-mentioned semi-circular form to the magazine which is constituted by them, and that the several hangers in each group are arranged at the same vertical inclination. Furthermore, it will be noted that the guides B which receive the matrices from the hangers extend substantially perpendicularly therefrom and are practically of the same extent, converging toward a line which passes vertically approximately through the central point of the hangers. This particular arrangement is very advantageous as it enables the matrices from all the hangers to pass to the assembling point quickly and in uniform time.

Eight different sizes of matrix bodies are employed in the sixteen magazine groups, those in opposite groups being of the same length and form, as will be understood by those skilled in the art. The several matrices are illustrated in Fig. 22, wherein, for instance, the matrices X¹, shown in edge and side view, are the shortest and the ones contained in the magazine group nearest to the assembling devices, as shown in Fig. 1. As there are six hangers D in the magazine group, there are consequently six sub-groups of matrices X¹ of the same length, but of variant form, adapted to be suspended thereby. All six sub-groups are provided with similar hooks Y³, whereby they are suspended from the hangers D, but with different selecting or distributing means. For instance, five of the sub-groups are formed each with a single separating hook $Y^4$, located in relatively different positions thereon, as indicated by full and dotted lines, and the sixth is without a separating hook. The six sub-groups of the matrices $X^2$ are also constructed in the same manner, five with differently located hooks $Y^4$, and one without the hook, and all six with the suspending hook $Y^3$. Each group of matrices $X^3$, $X^4$, $X^5$, $X^6$, $X^7$, and $X^8$ is similarly formed, all of them with suspending hooks, and five sub-groups with separating hooks and one sub-group without a separating hook, although for simplicity of illustration, the matrices of these groups without separating hooks are not shown in Fig. 22. The purpose and function of the separating hooks will be subsequently explained. It should be noted that the suspending hook $Y^3$ on each of the matrices is offset laterally or rearwardly from the body of the matrix, as clearly shown in Fig. 22, the purpose being to permit a greater freedom of movement of the matrix upon its guide without the consequent danger of becoming disengaged therefrom.

All of the matrices are formed with a plurality of intaglio characters $Y^1$, wherein the type letters are cast, and with a corresponding plurality of oppositely located notches $Y$ to engage an alining bar. Each matrix is also formed with a cut or notch $Y^5$ in its lower end to receive a stationary plate during its passage from the magazine to the casting position, and with a cut or notch $Y^2$ in its upper end to engage with the overlying guard $B^{40}$ to hold the matrix in proper relation to its guide B at certain times, as previously explained. The particular form of the matrix *per se*, however, will be made the subject of a separate application.

Referring again to the magazine, and particularly as shown in Figs. 4, 5, 9, 10, 11, 12, and 13, it will be seen that the six hangers D of each group are inclined and arranged in substantial parallelism to each other, and with their outer ends terminating in the same plane and over the underlying inclined discharging plate $D^1$, which at its end registers with the corresponding guide B, in such manner that the released matrices pass from the hangers D onto and along the discharging plate $D^1$, and thence onto and down the guide B to the assembling point. The release of the matrices from the hangers is controlled by the escapement devices E, which are actuated from the keyboard A.

Each of the escapements (see particularly Figs. 12, 18, and 19) comprises the pivoted lever $E^1$, provided with the depending alternately-acting escapement pawls $E^2$ and $E^3$, and actuated by the connection $E^4$. The particular form of escapement in itself constitutes no part of my present invention, and may be substantially the same in mode of operation as that set forth in my previously mentioned Letters-Patent No. 679,481. However, it will be noted that in the present instance each of the movable magazines is equipped with its own set of escapements, and consequently appropriate means have to be employed to effect their ready connection with and disconnection from the stationary keyboard mechanism. This I secure by so mounting the actuating connections $E^4$ in the magazine frame $A^{10}$, that when the latter is shifted to bring a new magazine into position, the ends of its connections $E^4$ will be located in direct registry with the ends of corresponding actuating pushers $E^5$ mounted in the main frame. Referring to Figs. 18 and 19, it will be seen that the pushers $E^5$ are suitably guided and connected at their ends to the levers $E^6$, which levers are in turn connected by the links $E^7$ to the keyboard mechanism A. In other words, due to the location of the respective ends of the connections $E^4$ and pushers $E^5$ in parallel vertical planes, the magazines may be moved at will and without requiring the attention of the operator either to connect or disconnect the actuating mechanism.

The semi-circular shape of the magazine, and the substantial parallelism of the links $E^7$, etc., necessitate different forms and arrangement of the levers $E^6$. For instance, in Fig. 19, this lever is shown as substantially straight, whereas in Fig. 20, it is shown as a bell-crank lever $E^{60}$, the difference arising from the location and inclination of the respective levers, as shown in Fig. 4, wherein the levers $E^6$ and $E^{60}$ are indicated as the two extreme ones, and the other levers between them as of intermediate form.

After the slug has been cast, and a group of matrices has been conveyed along the guide B to the outer end of the corresponding magazine group, it is necessary that they be divided into sub-groups, and that the latter be restored to their individual hangers D. The mechanism for accomplishing this result is best shown in Figs. 9, 10, 11, 12 and 13, wherein it will be seen that the guide B registers with the receiving end $D^{10}$ of the first or outermost hanger D, which end is formed of greater height than the main portion of the hanger, so as in effect to constitute a continuation of the guide.

In order to separate the matrices into sub-groups, and to secure the delivery of the sub-groups to their respective hangers, I employ a vertical series of superposed distributing bars F, arranged in substantial parallelism to the receiving ends of the hangers. These bars are preferably tubes, five in number, square in cross-section, open at their ends, and formed with cuts or slots along their inner sides, so as to adapt them to receive the before-mentioned separating hooks Y⁴ of the matrices. The several bars are of different extent, corresponding to the positions of the receiving ends of the respective hangers D. For instance, the upper bar F is of sufficient length to support the hook Y⁴ until the matrix reaches the extreme or farthest hanger, while the lowermost bar is only of sufficient length to enable the matrix sustained thereby to reach the second hanger.

The operation of the separating means will now be readily understood. All the matrices of the group are suspended by their hooks Y³ on the guide B and pass therefrom onto the portion D¹⁰ of the first hanger D. Taking first the case of a matrix not provided with the hook Y⁴, as it passes over the portion D¹⁰, it drops directly onto the first hanger and is thus again placed in storage. If, however, a matrix be provided with a separating hook Y⁴ before it leaves the portion D¹⁰, the hook according to its location on the matrix passes into one or the other of the tubes F, and the matrix is thus sustained by the tube throughout its extent, when it is permitted to fall and be supported by its hook Y³ upon its appropriate hanger. In other words, matrices of the first sub-group, unprovided with separating hooks, drop directly onto the first hanger, while matrices of the other five sub-groups, provided with separating hooks located in different relative positions, are sustained and held by the corresponding distributing bars until they reach their own hangers, as clearly indicated in Figs. 9 and 13.

As previously indicated, each of the matrices is formed with a plurality of intaglio characters Y¹, any one of which may be brought into operative position at will, and to effect this adjustment, I have devised a mechanism which will now be described. Referring to Fig. 15, it will be noted that the characteristic form of the guides B is somewhat altered in advance of the assembling point, that is to say, at the point B¹⁰, where the L-shaped guides are vertically offset, the vertical portion being also reduced in height and flared downwardly and outwardly, as is more clearly apparent at B²⁰ in the sectional portion of the same figure, and in Figs. 14 and 16. This changed form continues beyond the casting position to the point B³⁰, indicated in Fig. 7, where the normal form of the guide is resumed. The reason for the alteration will appear subsequently.

Referring to Figs. 3, 7, 15, 16 and 17, as the matrices pass along the guides B and over the portion B¹⁰, they drop upon the movable switch piece G², located in position to engage the cut or notch Y⁵ in the bottom ends thereof. The piece G² normally constitutes a continuation of the guiding plate G¹, which extends longitudinally and around into the casting position (see Figs. 7 and 15). When the switch is in its lowermost or normal position, the matrices drop to their normal position, the upper characters Y¹ are thereby brought into casting position, this relation being preserved by the engagement of the rib G with the oppositely located corresponding alining notch Y on the matrix, all in the manner well understood in the art. If, however, it be desired to cast mixed matter, or matter from the lowermost of the characters Y¹, the switch G² is elevated by the connected operating lever G³, to the position shown in Fig. 16, when the lower alining notch Y is brought into registration with the rib G. Fig. 17 illustrates matrices adjusted to cast mixed matter of the kind referred to, namely, one or more with their upper alining notches engaged by the rib G, and others with their lower alining notches thus engaged. As the rib G continues longitudinally and around to the casting position, as shown in the lower right-hand corner of Fig. 15 and in Fig. 7, the matrices continue to occupy their set positions until the slug is formed, after which they disengage from the rib and drop to the same level, and are returned by the guides to the magazine.

The reason for the changed construction of the guides B, extending from the point B¹⁰ to the point B³⁰, will now be explained. As the matrices pass from the unchanged portion of the guides, and over the portions B¹⁰ to assemblage, they normally drop onto the lowered switch G² (see Fig. 17), and their hooks Y³ are still sustained by the guides. If, however, the switch be elevated so as to bring the lower alining notch Y into engagement with the rib G (see Fig. 16), their hooks Y³ remain above and out of engagement with the guides. This elevated position of the matrices would not be possible with overlying guides of the regular form, but is permitted by the reduced and flared construction already described, and as clearly indicated at the point B²⁰ in Fig. 15.

As already stated, I have shown my improvements only in preferred form and by way of example, and as applied to the specific kind of machine illustrated, but many modifications and changes in construction and mode of adaptation will suggest themselves to those skilled in the art, without departure from their scope.

Having thus described my invention, its construction and mode of operation, what I claim and desire to secure by Letters-Patent of the United States is as follows:

1. In a typographical machine provided with a plurality of interchangeable series of suspended type or matrices, those of one series being of different font from those of another series, the combination of a single series of sustaining guides whereon the type or matrices travel from their place of storage to the place of assemblage, the said guides being common to all the fonts, and means for selecting one or another of the several fonts for use.

2. In a typographical machine comprising suspended type or matrices, the combination of a single series of sustaining guides, with a plurality of series of hangers to support the type or matrices in storage, any selected series of which may be connected at will to the said series of guides.

3. In a typographical machine comprising suspended type or matrices, the combination of a single series of sustaining guides, with a plurality of series of hangers to support the type or matrices in storage, and movably arranged so that any selected series thereof may be connected to the said series of guides.

4. In a typographical machine comprising suspended type or matrices, the combination of a fixed series of sustaining guides, a plurality of series of hangers to support the type or matrices in storage, and a frame carrying said storage hangers and movable to connect any selected series thereof with the fixed series of guides.

5. In a typographical machine, the combination of circulating suspended type or matrices, with continuous sustaining guides from which the matrices are suspended comprising an interchangeable section where the type or matrices are stored, said section being mounted in the machine so as to be movable to an operative or inoperative position therein at will.

6. In a typographical machine comprising suspended type or matrices, the combination of a single series of sustaining guides, with a plurality of interchangeable series of hangers upon which the type or matrices are stored, each series of hangers being adapted to be connected to the said series of guides, so as to constitute a circulating system for the type or matrices.

7. In a typographical machine comprising suspended type or matrices, the combination of a fixed series of sustaining guides, a plurality of series of hangers to support the type or matrices in storage and movable as a whole to connect any selected one thereof with the fixed series of guides, and a device to carry the type or matrices along the guides and restore them to the hangers.

8. In a typographical machine comprising suspended type or matrices, the combination of a fixed series of sustaining guides, with a plurality of series of storage hangers for the type or matrices, each series provided with a set of escapements, and the several series being movable as a whole to connect any selected one thereof with the fixed series of guides, together with a single set of operating devices to actuate the escapements of the selected series.

9. In a typographical machine comprising suspended type or matrices, the combination of a single fixed series of sustaining guides, a plurality of series of hangers upon which the type or matrices are stored, any selected one of which may be connected to the said series of guides, and each provided with a set of escapements, and a single set of operating devices to actuate the escapements of the selected series.

10. In a typographical machine comprising suspended type or matrices, the combination of a single series of sustaining guides, a plurality of series of hangers upon which the type or matrices are stored and each provided with a set of escapements, means for connecting any selected series of hangers to the series of sustaining guides, and operating devices to actuate the escapements of the selected series.

11. In a typographical machine, the combination of a group of suspended type or matrices, the group being divided into subgroups, and a single sustaining guide whereon the type or matrices travel in a continuous circuit from and to their place of storage, the said guide being common to the type or matrices of all the subgroups.

12. In a typographical machine, the combination of a plurality of groups of type or matrices, and a series of sustaining guides, one for each group, whereon the type or matrices travel in a continuous circuit from and to their place of storage, each of said groups being divided into subgroups which traverse the said guide in their travel.

13. In a typographical machine, the combination of a group of suspended type or matrices, the group being divided into subgroups, and a single sustaining guide whereon the type or matrices travel in a continuous circuit from and to their place of storage, the said guide being common to the type or matrices of all the subgroups, and means for delivering the type or matrices to the guide from the several subgroups.

14. In a typographical machine, comprising suspended type or matrices, the combination of a group of hangers to support the type or matrices in storage, and a single sustaining guide leading from and to the said group of hangers whereon the type or matrices from all of said hangers travel in a continuous circuit.

15. In a typographical machine comprising suspended type or matrices, the combination of a series of continuous sustaining guides whereon the type or matrices travel in a continuous circuit, the said guides having their ends separated from each other to provide a space between them, and a plurality of groups of hangers, one for each of said guides, located in the said space to support the type or matrices in storage, the parts being arranged so that the type or matrices may be delivered from the hangers to the guides and restored thereto by the latter.

16. In a typographical machine comprising suspended type or matrices, the combination of a series of continuous sustaining guides whereon the type or matrices travel in a continuous circuit, the said guides having their ends separated from each other to provide a space between them, and a plurality of groups of hangers, one for each of said guides, arranged in the said space to support the type or matrices in storage, and means for delivering the type or matrices from the hangers to the guides as required, said guides being arranged to restore the type or matrices to their proper hangers.

17. In a typographical machine comprising suspended type or matrices, the combination of a group of hangers to support the type or matrices in storage, a single sustaining guide leading from and to the said group of hangers whereon the type or matrices from all said hangers travel in a continuous circuit, and automatic means for carrying the type or matrices along the guide.

18. In a typographical machine comprising suspended type or matrices, the combination of a group of hangers to support the type or matrices in storage, a single sustaining guide extending in a continuous circuit from and to said group of hangers, means for delivering type or matrices from all the hangers to said sustaining guide, and automatic means for carrying them along the guide so as to restore them to the hangers.

19. In a typographical machine, the combination of a group of suspended type or matrices, the group being divided into subgroups, a single sustaining guide whereon the type or matrices travel in a continuous circuit from and to their place of storage, the said guide being common to the type or matrices of all the subgroups, and means for separating the type or matrices according to subgroup as they are returned to their place of storage.

20. In a typographical machine, comprising suspended type or matrices, the combination of a group of hangers to support the type or matrices in storage, a single sustaining guide leading from and to the said group of hangers and whereon the type or matrices from all of said hangers travel in a continuous circuit, and separating means located between the sustaining guide and group of hangers to deliver the type or matrices to one or another of the hangers according to form.

21. In a typographical machine, the combination of a plurality of groups of type or matrices, a series of sustaining guides, one for each group, whereon the type or matrices travel in a continuous circuit from and to their place of storage, each of said groups being divided into subgroups which traverse the same guide in their travel, and means for separating the type or matrices according to subgroup in their passage from the guides to their place of storage.

22. In a typographical machine comprising suspended type or matrices, the combination of a plurality of groups of hangers to support the type or matrices in storage, a series of sustaining guides leading from and to the hangers and whereon the type or matrices travel in a continuous circuit, and separating means located between the sustaining guides and hangers to deliver the type or matrices to one or another of the hangers according to form.

23. In a typographical machine, the combination of a group of suspended type or matrices, said group being divided into subgroups provided with separating hooks, the hooks of one subgroup being located at a different vertical point from those of another subgroup, with separating means to coöperate with said separating hooks and deliver the type or matrices at different points according to subgroup.

24. In a typographical machine, the combination of a group of suspended type or matrices, the said group being divided into subgroups, and means for separating the type or matrices according to subgroup, the type or matrices of several of the subgroups being provided with separating hooks to coöperate with the separating means and located in different vertical positions on the matrices in the respective subgroups, and those of another subgroup being without such separating hooks so as to be unacted upon by the separating means.

25. In a typographical machine comprising suspended type or matrices, the combination of a plurality of hangers to support the type or matrices in storage, the said hangers having their receiving ends arranged at different points, with separating means for the type or matrices comprising a plurality of superposed supporting bars terminating at corresponding points to deliver the type or matrices to their proper hangers.

26. In a typographical machine, the combination of suspended type or matrices of variant form, with separating means therefor comprising a series of superposed supporting bars of different lengths so as to release the type or matrices at corresponding points according to their form.

27. In a typographical machine, the combination of a group of suspended type or matrices, the said group being divided into sub-groups, with separating means therefor comprising a plurality of superposed supporting bars, the said bars being of different lengths to release the type or matrices at corresponding points according to sub-group.

28. In a typographical machine, the combination of a group of suspended type or matrices, the said group comprising sub-groups provided with separating hooks, the hooks of one sub-group being located at a different vertical point from those of another sub-group, with separating means comprising a plurality of bars arranged one above another, so that each may engage the hooks of the type or matrices of the corresponding sub-group and deliver them at the proper point.

29. In a typographical machine, the combination of a group of type or matrices each provided with a suspending hook, a plurality of hangers upon which the type or matrices are stored, a single sustaining guide from which the matrices are suspended by their hooks and along which they are returned for distribution, the said guide being connected directly with one of the hangers so that the suspending hooks of the corresponding type or matrices may pass from the guide onto the hanger, and distributing means for delivering the other type or matrices from the guide to their proper hangers.

30. In a typographical machine, the combination of a group of suspended type or matrices, the said group being divided into sub-groups, with separating means therefor comprising a plurality of superposed bars to deliver the type or matrices at different points, the type or matrices of one sub-group being provided with separating hooks located thereon in position to engage one of said bars, and the type or matrices of another sub-group being provided with separating hooks located thereon in position to engage a different bar.

31. In a typographical machine, the combination of a group of suspended type or matrices, the said groups being divided into sub-groups, with separating means therefor comprising a plurality of bars to deliver the type or matrices at different points, the type or matrices of one of the said groups being provided with separating hooks located thereon in position to engage one of the bars, and the type or matrices of another sub-group being without such separating hooks so as not to engage a bar.

32. In a typographical machine, the combination of suspended type or matrices, with a plurality of closely-disposed vertically-adjacent sustaining guides along which they travel, the said guides being recessed or cut away throughout a portion of their length to permit the relative vertical shifting of the type or matrices thereon.

33. In a typographical machine, the combination of suspended type or matrices, a sustaining guide along which they travel, the said guide being formed with a vertically depressed portion to permit the type or matrices to assume a lower level, and an alining blade located below said depressed portion to support selected type or matrices above the guide at a higher level.

34. In a typographical machine, the combination of suspended type or matrices, with a sustaining guide along which they travel first to the assembling position and therebeyond to the casting position, the said guide or wire being formed with a vertically depressed portion extending from the assembling position to and beyond the casting position, for the purpose described.

35. In a typographical machine, the combination of suspended type or matrices, a sustaining guide along which they travel, the said guide being formed with a vertically depressed portion to permit the type or matrices to assume a lower level, an alining blade located below said depressed portion to support selected type or matrices above the guide at a higher level, and means for controlling the level of the type or matrices.

36. In a typographical machine, the combination of suspended type or matrices, a sustaining guide along which they travel, the said guide being formed with a vertically depressed portion to permit the type or matrices to assume a lower level, an alining blade located below said depressed portion to support selected type or matrices above the guide at a higher level, and a switch for causing the type or matrices to pass to the upper or lower level as desired.

37. In a typographical machine comprising suspended type or matrices each formed with an open notch in its bottom edge, the combination of a sustaining guide along which the type or matrices travel, and a switching device to engage in the notches of the type or matrices as they pass along the guide and shift them individually vertically in relation thereto without interrupting their travel.

38. In a typographical machine comprising type or matrices each formed with an open notch in its bottom edge and with a further notch in one of its vertical edges, the combination of a sustaining guide along which the type or matrices travel, a switching device to engage in the notches in the lower ends of the type or matrices as they pass along the guide and shift them vertically individually in relation thereto without interrupting their travel, and a supporting blade to engage in the notches in the edges of the type or matrices and hold them in their shifted position.

39. In a typographical machine, the combination of suspended type or matrices, with a series of sustaining guides along which they travel, the said type or matrices being shiftable vertically with relation to the guides at one portion of the latter's extent, together with supplemental guard members overlying the guides at another portion of their extent to prevent such shifting of the type or matrices.

40. In a typographical machine comprising suspended type or matrices each formed with an open notch in its upper end, the combination of a sustaining guide upon which the type or matrices travel, and a guard member to engage in said notches in the type or matrices and prevent their shifting upon the guide.

41. In a typographical machine comprising suspended type or matrices, a series of groups of hangers upon which they are stored, the said groups being arranged at the same level, and a series of sustaining guides leading from the groups at an inclination thereto and extending to the point of assemblage.

42. In a typographical machine comprising suspended type or matrices, a series of groups of hangers upon which they are stored, the said groups being arranged at the same level and radially about a common central point.

43. In a typographical machine comprising suspended type or matrices, the combination of a series of groups of hangers upon which they are stored, the said groups being arranged radially about a common central point, and a series of guides leading from the groups at an inclination thereto and converging toward a common line passing vertically approximately through said central point.

44. In a typographical machine comprising suspended type or matrices, the combination of a series of groups of hangers upon which they are stored, and a series of sustaining guides leading from the groups at an inclination thereto and converging toward a common line, the said guides being of substantially the same extent from the groups to the line of convergence to insure the uniform delivery of the type or matrices from the hangers.

45. In a typographical machine comprising suspended type or matrices, the combination of a series of groups of hangers upon which they are stored, and a series of sustaining guides leading from the groups and converging toward a common line, the converging portions of the guides being of substantially the same extent and substantially perpendicular with relation to the groups to insure the quick and uniform delivery of the type or matrices.

46. In a typographical machine comprising suspended type or matrices, a series of groups of hangers upon which they are stored, said groups being arranged at the same level and each comprising a plurality of hangers, and the hangers in each group being arranged at the same vertical inclination.

In testimony whereof I have affixed my signature in presence of two witnesses.

JOHN R. ROGERS.

Witnesses:
DAVID S. KENNEDY,
LUTHER E. MORRISON.